United States Patent
Minnig et al.

(10) Patent No.: US 7,849,756 B2
(45) Date of Patent: Dec. 14, 2010

(54) LINEAR DRIVE WITH SAFETY MECHANISM FOR MOVING A STRUCTURE

(75) Inventors: Peter Minnig, Herford (DE); Heinrich Dück, Espelkamp (DE)

(73) Assignee: Dewert Antriebs- und Systemtechnik GmbH, Kirchlengern (DE)

( * ) Notice: Subject to any disclaimer, the term of this patent is extended or adjusted under 35 U.S.C. 154(b) by 1343 days.

(21) Appl. No.: 11/281,201

(22) Filed: Nov. 16, 2005

(65) Prior Publication Data

US 2006/0107776 A1 May 25, 2006

(30) Foreign Application Priority Data

Nov. 19, 2004 (DE) .................. 20 2004 017 769 U

(51) Int. Cl.
*F16H 25/20* (2006.01)
(52) U.S. Cl. ..................................... 74/89.26; 74/89.23
(58) Field of Classification Search ............... 74/89.23, 74/89.26; 254/13, 85, 92, 98
See application file for complete search history.

(56) References Cited

U.S. PATENT DOCUMENTS

| | | | | |
|---|---|---|---|---|
| 3,309,060 A | * | 3/1967 | Villars | ........................ 254/7 C |
| 5,755,310 A | * | 5/1998 | Wourms | ..................... 187/267 |
| 2002/0066325 A1 | * | 6/2002 | Roither et al. | ............. 74/89.23 |
| 2005/0103137 A1 | * | 5/2005 | Chang et al. | ............... 74/89.26 |

FOREIGN PATENT DOCUMENTS

| | | |
|---|---|---|
| DE | 19 41 814 U | 2/1971 |
| DE | 296 00 722 U | 8/1997 |
| DE | 199 60 932 A1 | 7/2000 |

\* cited by examiner

*Primary Examiner*—William C Joyce
(74) *Attorney, Agent, or Firm*—Henry M. Feiereisen; Ursula B. Day

(57) ABSTRACT

A linear drive for adjusting at least one movable structure includes at least one spindle drive having a rotatable spindle. Disposed on the spindle and restrained against rotation is a lifting nut which is linked to the movable structure. At least one safety mechanism is disposed on the spindle without connection to the lifting nut and restrained against rotation. The safety mechanism includes an inner nut attached to the spindle and an outer guide bushing attached onto the inner nut, wherein the inner nut and the guide bushing have an engagement structure which effects a form-fitting engagement between the inner nut and the guide bushing during normal operation and is so constructed as to effect a disengagement between the inner nut and the guide bushing, when the safety mechanism is subjected to a predefined load torque.

18 Claims, 4 Drawing Sheets

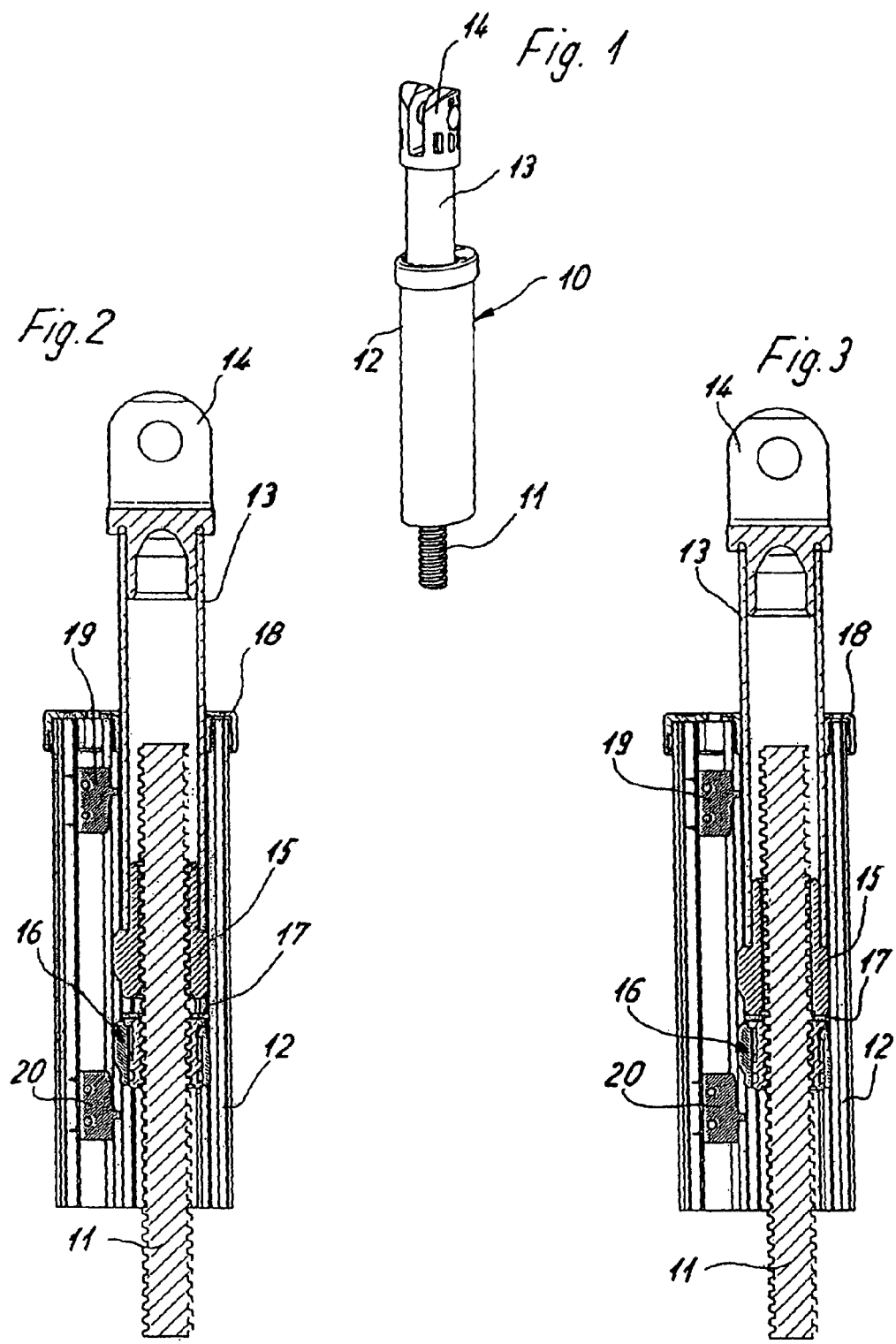

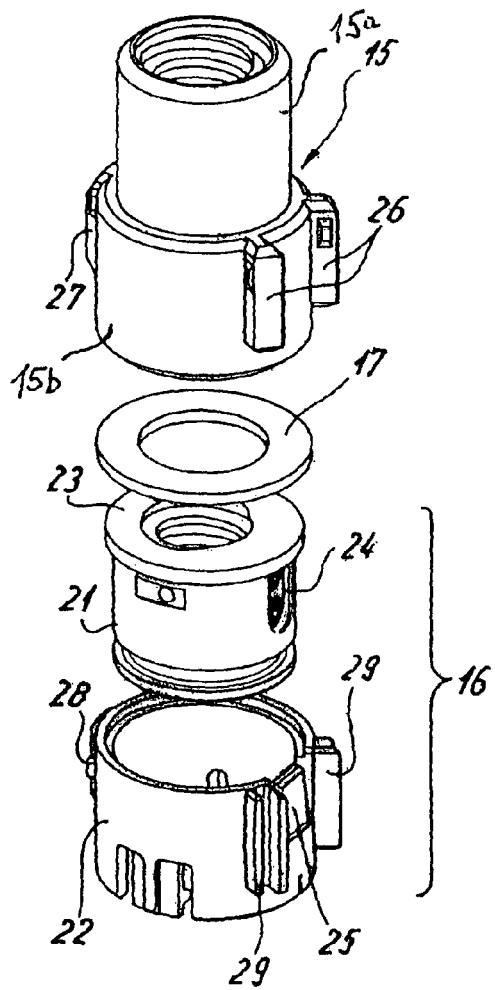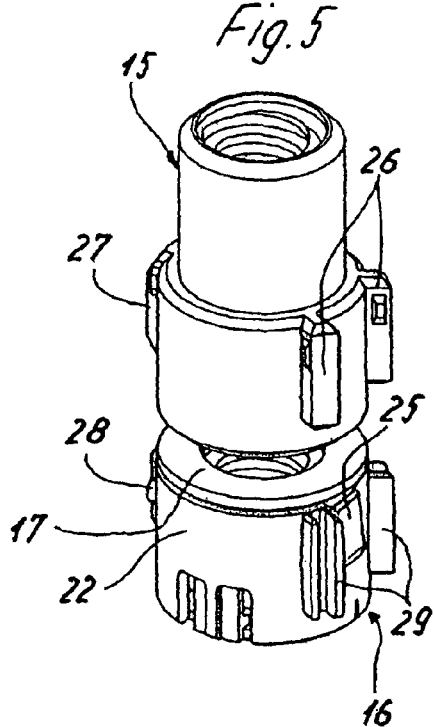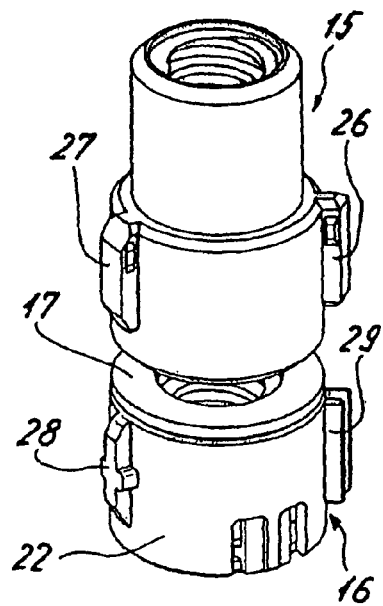

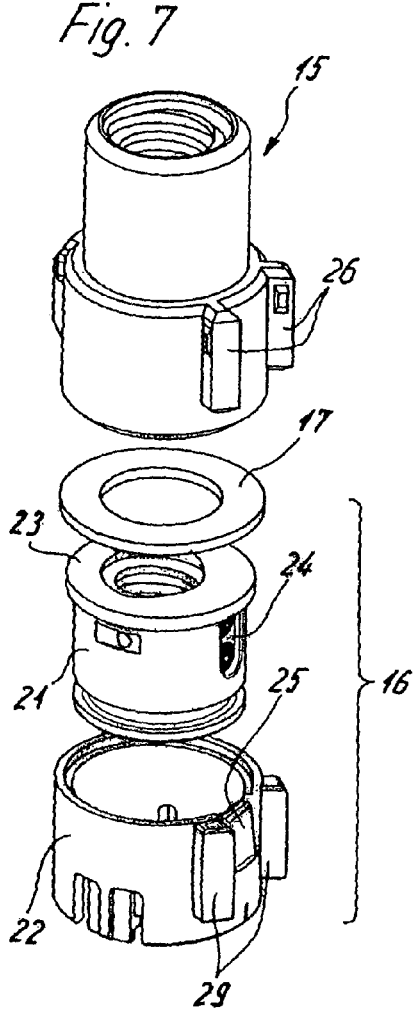
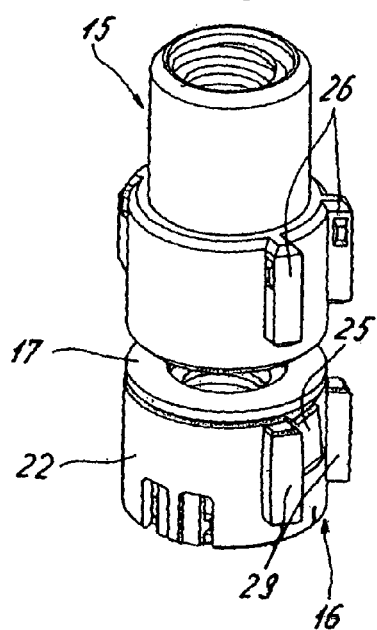
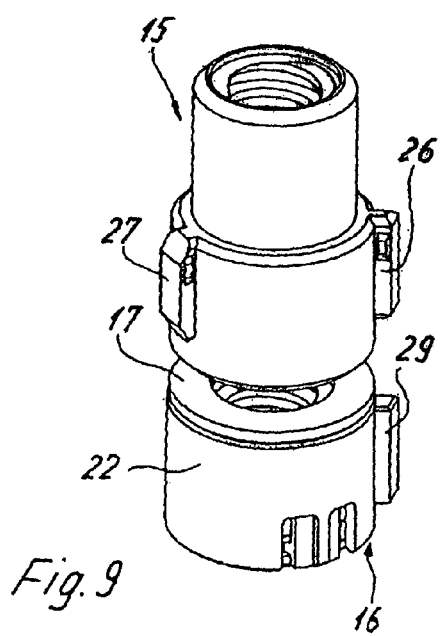

LINEAR DRIVE WITH SAFETY MECHANISM FOR MOVING A STRUCTURE

CROSS-REFERENCES TO RELATED APPLICATIONS

This application claims the priority of German Patent Application, Ser. No. 20 2004 017 769.2, filed Nov. 19, 2004, pursuant to 35 U.S.C. 119(a)-(d), the subject matter of which is/are incorporated herein by reference.

BACKGROUND OF THE INVENTION

The present invention relates, in general, to a linear drive for adjusting a movable structure, in particular a furniture structure.

Nothing in the following discussion of the state of the art is to be construed as an admission of prior art.

Linear drives of a type involved here are especially used for adjusting a structure of a furniture item, e.g. slatted frame or armchair, and are available as so-called single drives with a spindle drive and a drive motor, or as so-called double drives with two spindle drives which can be operated by a motor or by two motors. The spindle of each spindle drive is normally operated by a d.c. motor via a speed reduction gear train. Screw drives are typically used for reducing the motor speed.

Linear drives are low-cost mass products. The spindle of each spindle drive has attached thereon a lifting nut which is secured against rotation. The spindle is normally made of steel, while the lifting nut is made of plastic. The lifting nut is considered an expendable part which generally wears off after exceeding a certain operating time or after extended exposure to an excessive force. As a result, the structure to be adjusted suddenly collapses or moves in the direction of the applied load. This is uncomfortable for the user. Therefore, the use of a safety nut has been proposed for attachment onto the spindle to provide a stop by which the lifting nut is prevented from uncontrollably traveling along the spindle. While this approach allows the attached structure to be lowered at relatively small speed, the attachment of such a safety nut does no longer permit a lifting of the structure and thus operation of the structure in opposition to the applied load direction. Therefore, normal operation can resume only after replacement of the lifting nut.

Proposals to connect the safety nut with the lifting nut via webs to prevent continuous operation with the safety nut by rupturing the webs when applying a lifting force have proven impractical because in addition to the necessary replacement of the lifting nut, it is also required to replace the safety nut. Another approach to provide a coupling device between the lifting nut and the safety nut has also proven impractical in view of the complicated construction.

It would therefore be desirable and advantageous to provide an improved linear drive to obviate prior art shortcomings.

SUMMARY OF THE INVENTION

According to one aspect of the present invention, a linear drive for adjusting at least one movable structure includes at least one spindle drive having a rotatable spindle, a lifting nut disposed on the spindle and restrained against rotation, with the lifting nut being linked to the movable structure, and at least one safety mechanism disposed on the spindle without connection to the lifting nut and restrained against rotation, with the safety mechanism including an inner nut attached to the spindle and an outer guide bushing attached onto the inner nut, wherein the inner nut and the guide bushing have an engagement structure which effects a form-fitting engagement between the inner nut and the guide bushing during normal operation and is so constructed as to effect a disengagement between the inner nut and the guide bushing, when the safety mechanism is subjected to a predefined load torque.

During normal operation, when the lifting nut is still functional and not worn off, there is no connection between the lifting nut and the safety mechanism. Once worn off however, the lifting nut is able to move on the spindle only at a speed which is defined by the rotation speed of the spindle because the safety mechanism too travels at this linear speed. When a load is lowered, the load torque is significantly less than during lifting of the attached furniture structure. The inner nut and the guide bushing are interconnected to permit a lowering of the load. When, however, the load is intended to be elevated through reverse of the rotation direction, the form-fitting engagement between the inner nut and the guide bushing is removed so that the inner nut is now able to rotate relative to the guide bushing and thus can no longer move along the spindle.

According to another feature of the present invention, the form-fitting engagement between the inner nut and the guide bushing may be constructed to have at least one component which is rendered ineffective through destruction, when the safety mechanism is subjected to the predefined load torque. The destruction generally occurs when applying the predefined load torque to move or lift the attached structure in opposition to the load. Suitably, the engagement structure may be realized by forming one of the inner nut and guide bushing with a spring finger, and the other one of the inner nut and guide bushing with a recess for engagement of the spring finger. During normal operation, the safety mechanism is loaded solely by the torque as a result of friction of the threads. The spring finger is hereby constructed to allow easy lowering of the attached furniture structure. However, when reversing the rotation of the spindle, the spring finger breaks off. Of course, a plurality of spring fingers may be provided on one member for engagement in a corresponding number of recesses in one-to-one correspondence, whereby the spring fingers may break off or simply overrun teeth or profiles, when the spindle rotates in opposite direction.

According to another feature of the present invention, the spring finger may be formed by a slit in the guide bushing for engagement in the recess of the inner nut. The recess extends inwardly from the outer circumference of the inner nut. As the outer guide bushing can be made of plastic through an injection molding process, a suitable configuration can be realized through appropriate dimensioning of the mold. Resilient and elastic characteristics of plastics can hereby be exploited.

According to another feature of the present invention, the guide bushing may be made of elastically deformable material to allow application of a friction torque between the guide bushing and the inner nut. The friction torque is large enough to maintain the guide bushing and the inner nut fixed during normal operation. Once rupture occurs, the friction torque is overcome so that the inner nut starts to rotate while the guide bushing continuous to remain fixed. During normal operation, the friction torque is sufficient to secure the inner nut against rotation. The elasticity may, for example, be realized by providing the guide bushing with an inner surface of a configuration deviating from a circular shape in the absence of a load. In other words, the inner surface is out-of-round. The guide bushing may hereby have in the absence of a load an inner diameter which has at least one section which is smaller than an outer diameter of the inner nut. In other words, the guide bushing is continuously under tension and thus deformed.

As an alternative, the elasticity of the guide bushing may also be realized by providing the guide bushing with an elongate slot extending over the entire length thereof, and by providing the inner surface of the guide bushing with profiles which extend out for engagement in complementary indentations of the inner nut. As a result, a form-fitting engagement is realized between the guide bushing and the inner nut and is so constructed that the guide bushing widens when a certain torque is exceeded so as to allow the inner nut to rotate on the spindle. This configuration is advantageous because there are no components that are subject to breakage. Examples for profiles include sharp-edged ribs or rounded beads which are so configured that a connection between the guide bushing and the inner nut is removed, when a predefined torque is exceeded. Profiles in the form of sharp-edged ribs may rupture, when a predefined torque is exceeded, or the guide bushing may slightly widen to allow a bead to engage in a further recess of the inner nut.

According to another feature of the present invention, the guide bushing may be constructed for movement relative to the inner nut and has an end surface arranged in confronting relationship to the lifting nut and extending beyond an adjacent end surface of the inner ring. Upon rupture, the inner nut moves the guide bushing along the spindle until the lifting nut rests against the inner nut. At least one coupling rail or spring finger should hereby break off.

According to another feature of the present invention, the lifting nut is arranged at a distance to the safety mechanism so long as the lifting nut is operational. In other words, a predefined distance is maintained between the confronting end surfaces of the lifting nut and the safety mechanism. In the event, the threads of the lifting nut break, the lifting nut impacts the safety mechanism which then assumes solely the down operation of the attached furniture structure. The distance between the lifting nut and the safety mechanism should be small compared to the length of lifting nut and the safety mechanism.

To protect the safety mechanism, a washer of metal, e.g. steel, may be disposed between the lifting nut and the safety mechanism. The washer may be constructed to provide elasticity or resiliency in relation to a longitudinal axis of the spindle and may be flat, disk-shaped or have an undulated configuration. As an alternative, the washer may be constructed as rigid or resilient ring or disk with teeth at least on one side which are symmetric or asymmetric in relation to a rotation axis of the spindle so that the tips of the teeth bear at least upon the lifting nut or safety mechanism or dig into it. The angle of the teeth may be selected to facilitate a rotation of the washer relative to the lifting nut or safety mechanism in one rotation direction, when a force is applied in longitudinal direction of the spindle.

According to another feature of the present invention, the guide bushing and the inner nut are arranged in offset relationship in longitudinal direction of the spindle, and a web assembly may be provided for connecting the guide bushing to the inner nut. A break of the threads of the lifting nut results in an impact of the lifting nut upon the safety mechanism. As the applied force is increased on the guide bushing, the defective lifting nut causes the guide bushing to move until the lifting nut rests completely upon the inner nut. This relative movement between the guide bushing and the inner nut causes detachment of the guide bushing from the inner nut in rotation direction, for example, through rupture of the connecting webs between the guide bushing and the inner nut or through detachment of resilient webs.

According to another feature of the present invention, the lifting nut and the inner nut of the safety mechanism may have a generally circular ring shaped cross section, whereby guide and switching cams are formed on the outer surfaces.

According to another feature of the present invention, the lifting nut may include two nut portions, with one of the nut portions having a cross section which is greater than a cross section of the other one of the nut portions and has at least one guide rail and one switching cam, whereby the switching cam is used to limit a first end position of the attached furniture structure. Another guide rail and switching cam may optionally be provided on the outer circumference of the guide bushing of the safety mechanism to limit the movement of the furniture structure to the second end position.

A linear drive according to the invention may be used as a so-called thrust drive, in which the furniture structure is adjusted when the lifting nut is moved in opposition to the load, for example in the direction of the free end of the spindle. The safety mechanism is then arranged on a side of the lifting nut in proximity of the speed reduction gear train and thus behind the lifting nut, as viewed in load direction.

According to another feature of the present invention, a further such safety mechanism may be provided, whereby the two safety mechanisms may be arranged on the spindle at both sides of the lifting nut. This configuration is advantageous, when the linear drive operates as thrust drive or traction drive.

According to another aspect of the present invention, a linear drive for adjusting at least one movable structure includes at least one spindle drive having a rotatable spindle, a lifting nut disposed on the spindle and restrained against rotation, with the lifting nut being connected to an output member, and at least one safety mechanism disposed on the spindle at a distance to the lifting nut and restrained against rotation, with the safety mechanism being made of single-piece construction and having an outer surface provided with a projecting spring pin for engagement in an elongate slot of the output member.

As a result of the arrangement of the spring pin, the safety mechanism is secured against rotation. When failing, the lifting nut positions itself in front of the safety mechanism. The attached furniture structure can still be lowered. However, when reversing the rotation direction of the spindle to lift the furniture structure, the spring pin breaks and the safety mechanism rotates on the spindle so that a movement in linear direction is no longer possible. This type of linear drive is applicable only as traction drive, i.e. the safety mechanism is arranged on the side of the lifting nut which faces the free end and thus is arranged between the point of load attack of the attached furniture structure and the lifting nut. The safety mechanism is again distanced to the lifting nut. When a traction drive is involved, the intact lifting nut travels in the direction toward the speed reduction gear train as the spindle rotates. The elongate slot in the output member could conceivably be configured as passageway or defined by two spaced-apart elongate ribs which are formed or attached on the inner side of the output member.

The linear drive can be so configured that the output member is securely mounted to the lifting nut. Normally the output member is a lifting tube when the linear drive is constructed as thrust drive. In this embodiment, a fork head is placed onto the free end of the lifting tube to establish the connection with a furniture structure. In the event, the linear drive operates as traction drive, the lifting nut is positioned anteriorly of the safety mechanism in relation to the load applied in longitudinal direction of the spindle. In other words, the safety mechanism is positioned on the side of the lifting nut which is distal to the speed reduction gear train for driving the spindle.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a perspective illustration of one embodiment of a linear drive in the form of a single drive in accordance with the present invention;

FIG. 2 is a longitudinal section of the linear drive with intact lifting nut;

FIG. 3 is a longitudinal section of the linear drive with defective lifting nut;

FIG. 4 is an exploded, perspective view of one variation of a safety mechanism for use in the linear drive;

FIG. 5 is a perspective view of the assembled safety mechanism;

FIG. 6 is a rotated perspective view of the assembled safety mechanism of FIG. 5;

FIG. 7 is an exploded, perspective view of another variation of a safety mechanism for use in the linear drive;

FIG. 8 is a perspective view of the assembled safety mechanism;

FIG. 9 is a rotated perspective view of the assembled safety mechanism of FIG. 8.

DETAILED DESCRIPTION OF PREFERRED EMBODIMENTS

Figure 10:
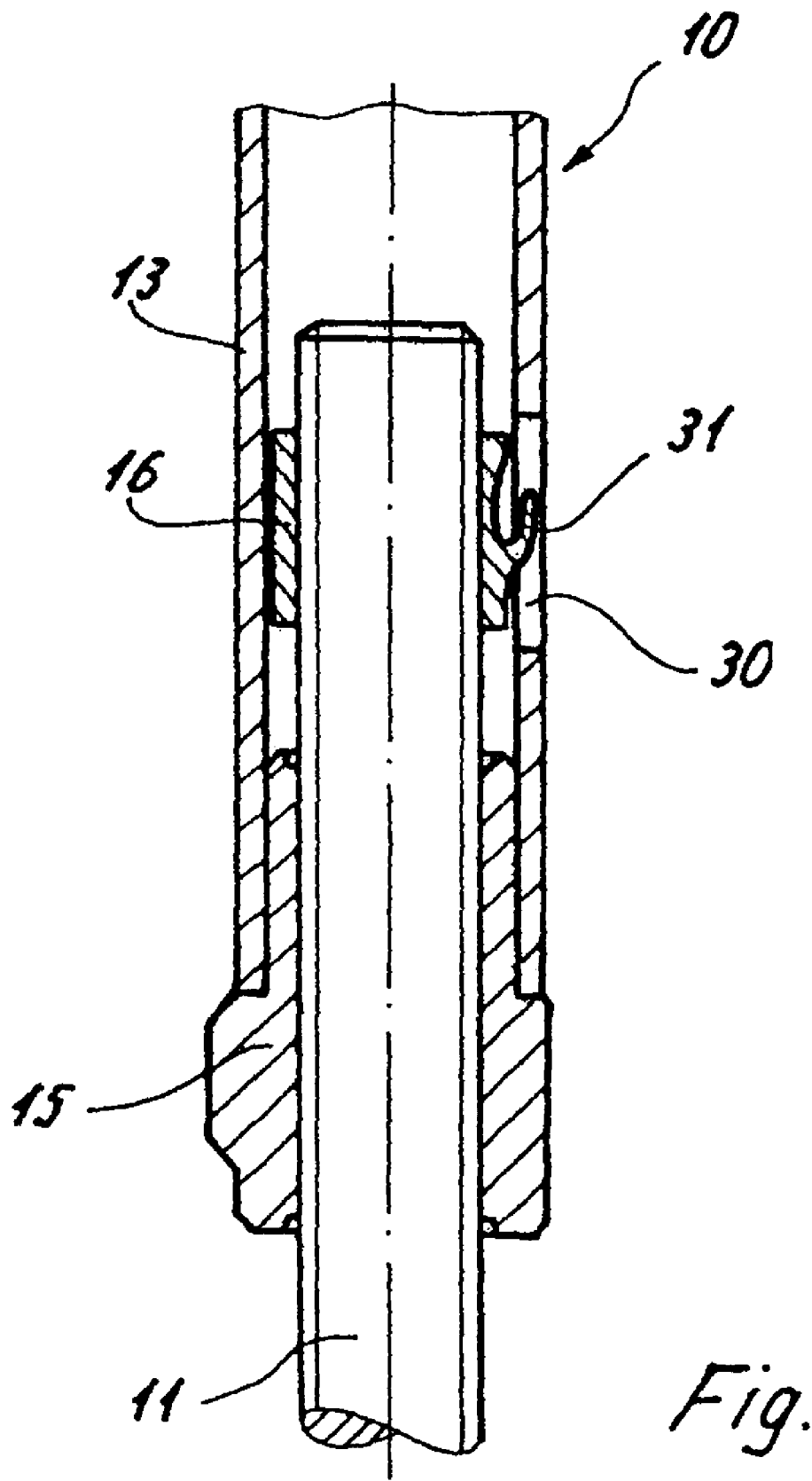
FIG. 10 is a sectional view of another embodiment of a linear drive in the form of a single drive in accordance with the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective illustration of one embodiment of a linear drive, generally designated by reference numeral 10 and constructed in the form of a single drive in accordance with the present invention. For sake of simplicity, only those parts of the linear drive 10 are shown that are relevant for the understanding of the present invention. The linear drive 10 has a rotatable spindle 11 which is in driving relationship with an unillustrated speed reduction gear train operated by a d.c. motor. The speed reduction gear train and the d.c. motor are accommodated in a housing of the linear drive 10 which further includes an outer flanged tube 12, which is securely mounted to the housing, and an extendible inner lifting tube 13 having a free end for attachment of a fork head 14 by which a connection to an unillustrated furniture structure can be established.

As shown in FIG. 2, a lifting nut 15 and a safety mechanism, generally designated by reference numeral 16, are disposed on the spindle 11 and spaced from one another. FIG. 2 shows the normal mode of operation, illustrating the distance between the lifting nut 15 and the safety mechanism 16, which distance is significantly smaller than the length of either the lifting nut 15 or the safety mechanism 16.

Disposed between the lifting nut 15 and the safety mechanism 16 is a washer 17 which is made of metal, e.g. steel. The flanged tube 12 is constructed to secure the lifting nut 15 and the safety mechanism 16 against rotation. The lifting nut 15 and the safety mechanism 16 are hereby provided with guide webs or guide cams, as will be described furtherbelow. Placed upon the free end of the flanged tube 12 is an end cap 18 which is formed with a bore for guidance of the lifting tube 13. Disposed in the flanged tube 12 are two limit switches 19, 20 to define the end positions of the lifting nut 15 and the safety mechanism 16 and thus of the furniture structure to be adjusted.

The spindle 11 is typically made of steel, whereas the lifting nut 15 and the safety mechanism are made of plastic. So long as the safety mechanism 16 is positioned at a distance to the lifting nut 15, the safety mechanism 16 does not transmit a load torque. Once the lifting nut 15 becomes defective following an extended operational period of the linear drive 10, the lifting nut 15 drops in longitudinal direction of the spindle 11 towards the safety mechanism 16 and ultimately rests against the washer 17 as a result of the weight of the attached furniture structure, as shown in FIG. 3. When this occurs, the safety mechanism 16 now assumes the function of the lifting nut 15 so that the attached furniture structure can be lowered at a velocity which is dependent on the rotation speed of the spindle 11 and the pitch. When reaching the lower end position accompanied by an actuation of the limit switch 20, the safety mechanism 16 is prevented from moving in the opposite direction, when the rotation of the spindle 11 is reversed, as will be described hereinafter.

Referring now to FIG. 4, there is shown an exploded, perspective view of one variation of a safety mechanism 16 for use in the linear drive 10. The safety mechanism 16 includes an inner nut 21 and an outer guide bushing 22 in surrounding relationship to the inner nut 21. On its end surface confronting the lifting nut 15, the inner nut 21 has a collar 23 of greater diameter so as to extend out beyond the periphery of the inner nut 21. The collar 23 has an outer diameter which corresponds to or approximates an outer diameter of the washer 17, as shown in particular in FIGS. 5 and 6. The inner nut 21 is provided with a pocket or recess 24 which extends inwardly from the outer surface. In the assembled state of the safety mechanism 16 (FIGS. 5, 6), the recess 24 is engaged by a spring finger 25 which is formed by a slit in the wall of the guide bushing 22. The recess 24 and the spring finger 25 jointly define the form-fitting engagement structure of the linear drive 10. As a consequence of the engagement of the spring finger 25 in the recess 24, the inner nut 21 is connected form-fittingly with the guide bushing 22.

The lifting nut 15 is stepped in midsection to thereby define a nut portion 15a of smaller diameter at a side distal to the safety mechanism 16, and a nut portion 15b of greater diameter which confronts the safety mechanism 16. The nut portion 15b is provided with guide webs 26 for engagement in respective unillustrated longitude grooves of the flanged tube 12 so as to secure the lifting nut 15 against rotation. In addition, the nut portion 15b is provided with a switching cam 27 for actuating the limit switch 19 when reaching the upper end position. Likewise, the guide bushing 22 is provided with a switching cam 28 for actuating the limit switch 20 when reaching the lower end position. The guide bushing 22 includes guide webs 29 to secure also the safety mechanism 16 against rotation.

FIG. 5 shows the assembled state of the lifting nut 15 in relation to the safety mechanism 16. In this position, the spring finger 25 engages the recess 24. As the safety mechanism 16 is idle during normal operation of the lifting nut 15, the formfitting connection between the spring finger 25 and the recess 24 is maintained. The spring finger 25 is configured to allow lowering of the attached furniture structure even when the lifting nut 15 is defective, as shown in FIG. 3. However, in the event the furniture structure should be elevated, increased torque is transmitted via the inner nut 21 to the spring finger 25 which transmits the torque via the guide bushing 22 to the flanged tube 12. The torque is high enough to cause destruction or at least a deformation of the spring finger 25 to disengage from the recess 24. As a consequence, the inner nut 21 rotates in correspondence to the rotation speed of the spindle 11 so that the furniture structure can no longer be moved in opposition to the load.

FIG. 6 shows the safety mechanism 16 and the lifting nut 15 in slightly rotated disposition to render the switching cams 27, 28 visible. The switching cam 26 for actuating the limit switch 20 has hereby a crossed configuration.

Referring now to FIGS. 7-9, there are shown views similar to FIGS. 4-6, of another variation of a safety mechanism 16 for use in the linear drive 10. Parts corresponding with those in FIG. 4 are denoted by identical reference numerals and not explained again. The description below will center on the differences between the embodiments. In this embodiment, the guide bushing 22 of the safety mechanism 16 lacks the provision of a switching cam 28 to merely stress that the lower end position of the lifting nut 15 and thus of the attached furniture structure can be ascertained in a different way so that the lifting nut 15 is able to actuate the limit switch 19 as well as the limit switch 20.

FIG. 10 is a sectional view of another embodiment of a linear drive 10 in the form of a single drive in accordance with the present invention for use as traction drive. In other words, the lifting tube 13 and thus the spindle 11 are subjected to traction for adjusting the attached furniture structure. Parts corresponding with those in FIG. 2 are denoted by identical reference numerals and not explained again. The description below will center on the differences between the embodiments. In this embodiment, the safety mechanism is arranged on the side of the lifting nut 15 distal to the unillustrated speed reduction gear train and is constructed here in the form of of single-piece safety nut 16 which has an outer side formed with a spring pin 31 etxending outward for engagement in an elongate slot 30 of the lifting tube 30. During normal operation, the safety nut 16 is thus secured against rotation. In the event the lifting nut 15 becomes defective and non-operational, the lifting nut 15 slides along the spindle 11 in the direction of the safety nut 16 until resting against the safety nut 16. Although not shown, it is, of course, conceivable to place a washer 17 between the lifting nut 15 and the safety nut 16. The spring pin 31 is constructed to allow lowering of the attached furniture structure by means of the safety nut 16. In other words, the lifting nut 15 and the safety nut 16 are able to move to the end positions. However, in the event the attached furniture structure should be moved under load through change in the rotation direction of the spindle 11, the spring pin 31 either breaks off or springs back so that the safety nut 16 is able to co-rotate with the spindle 11, thereby preventing an adjustment of the furniture structure.

Although not shown in detail, it is, of course, possible to have the spring pin 31 engage in an elongate slot demarcated by two longitudinal rails formed on the inside of the lifting tube 13. Relevant is only that the safety mechanism 16 is secured against rotation druing normal opeation and allows a lowering of the furniture structure only, when the lifting nut 15 becomes inoperational.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated. Relevant is the detachment of the lifting nut 15 from the safety mechanism 16, whereby in a first embodiment the safety mechanism 16 is comprised of inner nut 21 and outer bushing 22, as shown in FIGS. 4-7, which are formfittingly connected by the engagement of the spring finger 25 in the recess 24 during normal operation but detached from one another, when the lifting nut 15 becomes ineffective so that the inner nut 21 is able to rotate in opposition to the load direction as the spindle rotates. In a second embodiment, the spring pin 31 on the safety nut 16 is guided in the elongate slot 30 of the lifting tube 13 to prevent a rotation of the safety nut 16 during normal operation while breaking off or disengaging, when the lifting nut 15 becomes ineffective and the load torque to be transmitted is greater than required to lower the furniture structure.

Regardless of the configuration of the safety mechanism 16, the lifting nut 15 is arranged anteriorly of the safety mechanism 16 as viewed in operative direction of the load applied along the spindle 11.

Although not shown in detail, an embodiment is also conceivable with two safety mechanisms 16, respectively disposed on either side of the lifting nut 15. Furthermore, the furniture structure to be adjusted may be linked indirectly and via a lifting tube 13 and optionally via the fork head 14 placed on the lifting tube 13. The furniture structure may also be directly connected to the lifting nut 15, whereby the lifting nut 15 has flat surfaces in parallel relationship to the longitudinal center axis of the spindle 11. The flat surfaces may have pins or bore extending perpendicular thereto.

What is claimed as new and desired to be protected by Letters Patent is set forth in the appended claims and includes equivalents of the elements recited therein:

What is claimed is:

1. A linear drive for adjusting at least one movable structure, comprising:
   an outer tube;
   at least one spindle drive having a rotatable spindle and defined by an axis;
   a lifting nut disposed on the spindle and engaging the outer tube to prevent rotation, said lifting nut being linked to a movable structure; and
   at least one safety mechanism disposed on the spindle at an axial distance to the lifting nut and engaging the outer tube to prevent rotation so that the safety mechanism and the lifting nut are movable in a direction of the axis along the spindle and along the outer tube, said safety mechanism including an inner nut attached to the spindle and an outer guide bushing attached onto the inner nut, wherein the inner nut and the guide bushing have an engagement structure which effects a form-fitting engagement between the inner nut and the guide bushing during normal operation and is so constructed as to effect a disengagement between the inner nut and the guide bushing, when the safety mechanism is subjected to a predefined load torque.

2. The linear drive of claim 1, wherein the engagement structure has at least one component which is rendered ineffective, when the safety mechanism is subjected to a predefined load torque.

3. The linear drive of claim 2, wherein the one component is rendered ineffective by breaking off.

4. The linear drive of claim 2, wherein the one component is rendered ineffective by overrunning teeth of the spindle.

5. The linear drive of claim 1, wherein one member selected from the group consisting of inner nut and guide bushing is formed with a spring finger, whereas another member of said group includes a recess for engagement of the spring finger to thereby form the engagement structure.

6. The linear drive of claim 5, wherein the guide bushing has a slit to thereby form the spring finger.

7. The linear drive of claim 1, wherein the guide bushing is made of elastically deformable material to allow application of a friction torque between the guide bushing and the inner nut.

8. The linear drive of claim 7, wherein the guide bushing has an inner surface of a configuration deviating from a circular shape when the guide bushing is non-deformed, whereby the guide bushing has an inner diameter which has at least one section which is smaller than an outer diameter of the inner nut.

9. The linear drive of claim 7, wherein the guide bushing has an elongate slot extending over an entire length of the guide bushing, and an inner surface formed with profiles which extend out for engagement in complementary indentations of the inner nut.

10. The linear drive of claim 7, wherein the guide bushing is constructed for movement relative to the inner nut and has an end surface arranged in confronting relationship to the lifting nut and extending beyond an adjacent end surface of the inner ring, when the lifting nut is intact.

11. The linear drive of claim 1, wherein the lifting nut is arranged at a distance to the safety mechanism, when the lifting nut is intact.

12. The linear drive of claim 1, further comprising a washer disposed between the lifting nut and the safety mechanism.

13. The linear drive of claim 12, wherein the washer has a flat, disk-shaped or undulated configuration and is so constructed as to provide elasticity or resiliency in relation to a longitudinal axis of the spindle.

14. The linear drive of claim 1, wherein the lifting nut and the inner nut of the safety mechanism have a circular ring shaped cross section.

15. The linear drive of claim 1, wherein the lifting nut includes two nut portions, with one of the nut portions having a cross section which is greater than a cross section of the other one of the nut portions and has guide webs and at least one switching cam.

16. The linear drive of claim 1, wherein the safety mechanism is arranged on a side of the lifting nut in proximity of a speed reduction gear train in load direction behind the lifting nut.

17. The linear drive of claim 1, further comprising a lifting tube extending between the lifting nut and the movable structure.

18. The linear drive of claim 1, wherein the lifting nut is arranged anteriorly of the safety mechanism as viewed in load direction on the spindle.

* * * * *